Patented July 29, 1924.

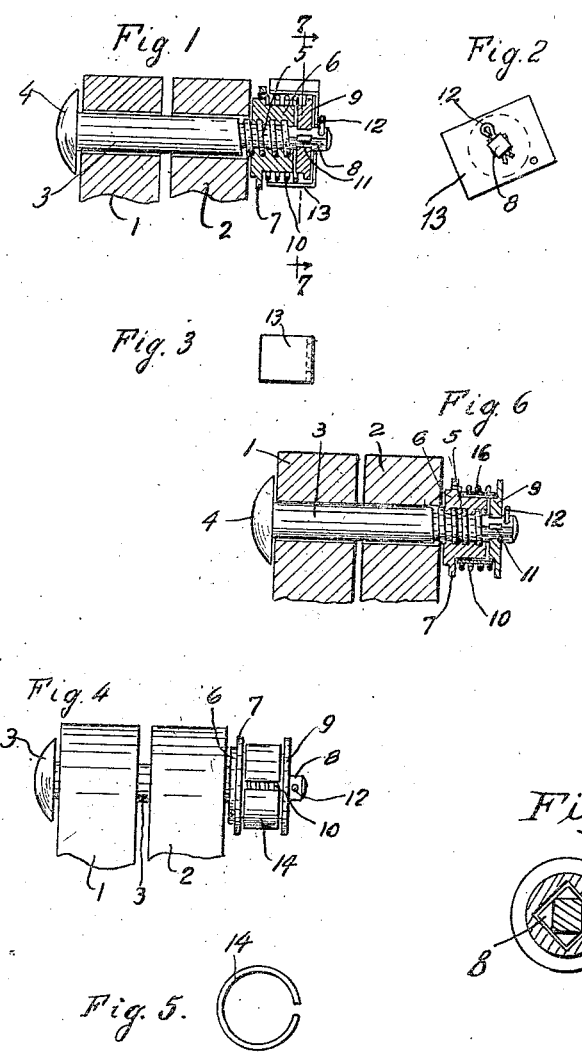

1,502,737

UNITED STATES PATENT OFFICE.

GUSTAVE L. MILLER, OF GENESEO, ILLINOIS.

AUTOMATIC BOLT ADJUSTMENT FOR BEARINGS.

Application filed December 22, 1921. Serial No. 524,095.

*To all whom it may concern:*

Be it known that I, GUSTAVE L. MILLER, a citizen of the United States, residing at Geneseo, in the county of Henry and State of Illinois, have invented certain new and useful Improvements in Automatic Bolt Adjustments for Bearings, of which the following is a specification.

My invention relates to automatic bolt adjustments for bearings, and is more specially designed to compensate for the wear of the linings in the crank-shaft bearings of motor-vehicle engines. A number of devices have been designed for this purpose, one of which consists in providing the retaining bolt with a pair of nut members, united by a tension spring in such a way as to permit a limited amount of spread to the nuts, whereby one of such nuts would be caused to follow up the bearing in which it is in contact, compelling a close relation of the bearing parts. The operation of positioning the nut members, and giving the proper tension to the spring, is a difficult one, especially to a person not accustomed thereto, or when the same is being done from beneath the motor, as is frequently the case. The operation includes a locking of one of the nuts to the bolt, after the proper tension of the spring has been attained, which locking is usually accomplished by passing a pin through a hole in the bolt and through openings in the castellated end of the nut. The tension being of a torsion nature, the opening in the bolt frequently does not register with the notches in the nut when the desired tension has been secured, and adjustments have to be made. Occasionally the nut will spring back, and have to be re-wound.

The chief purpose of the present invention is to overcome the above named difficulties, and make the proper tension adjustments with comparative ease. This is accomplished by forming locking means on the end of the bolt, with which the tension nut or collar will coact, so that the bolt can be made to quickly receive the strain resulting from the tension.

Another purpose of the invention is to provide means for preventing the whipping action of the tension spring, which is likely to occur in the operation of the crank-shaft, and which in time will impair the efficiency of the spring, with possible breakage, and injury to the motor.

The above named, and other features and advantages of the invention will be more fully understood from the following specifications, reference being had to the accompanying drawings, in which:—

Fig. 1 shows a bolt equipped with my invention, with some of the parts in section.

Fig. 2 is an end view thereof.

Fig. 3 is an end view of the clip 13.

Fig. 4 shows the device fitted with a modified form of guard.

Fig. 5 is a detail of the guard 14.

Fig. 6 shows the device with a different arrangement of the guard.

Fig. 7 is a cross-section on the broken line 7—7 of Fig. 1.

1 and 2 represent portions of a bearing, united by a bolt 3, having a head 4 at one end and a threaded portion 5 near the other end. A nut 6 is threaded to turn on the part 5, so as to be capable of having a bearing against the part 2, and is provided near its inner end with a flange 7. The outer end of the bolt beyond the thread 5 is square, or of other polygonal formation, in cross-section, as at 8, so as to receive a collar member 9, of rectangular form, and provided on its inner face with a circular portion conforming to the shape of the nut 6, and forming with such nut a seat for a coiled spring 10, secured at one end to the flange 5 and at the other end to the collar 9. Said collar is provided with a central opening conforming in shape with the squared end of the bolt, and of slightly greater dimensions, so as to pass easily over the end of the bolt. When said collar is in position on the end of the bolt it is impossible to turn the same thereon, and in order to give a torsion tension to the spring 10, or to increase the tension thereof, it is necessary to slip the collar beyond the end of the bolt, and turn the same in a direction to cause a close contact of the nut 6 against the bearing 2. When the proper tension has been attained the collar 9 is again slipped on the end of the bolt, retaining the tension of the spring 10.

The parts 1 and 2 are shown slightly separated, as is the case when the lining of the bearing is new, and as such lining wears the tension of the spring 10 exerts a force upon the nut 6 which causes such nut to crowd the part 2 towards the part 1, preventing looseness or pounding of such parts. As the collar can be slipped onto the bolt at each quarter turn thereof, it is a comparatively easy matter to give to such collar the desired amount of rotation, and then position it on the bolt.

To assist in holding the collar 9 in position on the bolt, the corners of the squared portion 8 are provided with notches 11, a little distance from the end of the bolt, into which notches the inner edges of the collar enter, preventing movement thereof longitudinally of the bolt, the tension of the spring 10 tending to hold the collar locked in such position. When it is desired to release the collar, it is turned a little ways against the tension of the spring, and then slipped from the bolt. For additional security the end of the bolt is perforated to receive a pin 12, but in case of breakage or loss of such pin, the collar will still be held in place.

It will be evident that in order that the above-named parts shall be operative, the bolt 3 must be held immovably in place in the bearing.

When the bolt is first placed in position, with the spring 10 at its highest tension, the coils of such spring are drawn tightly together, but as the bushing of the bearing becomes worn, and the parts 6 and 9 separate, the coils become looser and have a greater diameter. As a result, when the connecting rod is in motion a whipping action is given to the coils, so that they rub against each other, causing the same to wear, reducing the tension power of the spring, and finally resulting in the breakage thereof. This wearing action is augmented by the carbon and other ingredients in the crank-case. To prevent this whipping action I provide a clip 13, perforated to slip over the end of the bolt, transversely of the collar 9, and provided with retaining arms which limit the outward movement of the coils of the spring 10.

In Figs. 4 and 5 is shown a circular form of clip, made of spring metal, which is slipped over the coils of the spring, and retains them in a desired position. The ends of said clip are separated a little distance so as to permit any sediment which may work into the coils to work out again. In Fig. 6 is shown a form of spring 16, which is fitted on the inside of the spring 10, and exerts an outward pressure against the coils thereof, to prevent a too violent action of such coils.

Changes can be made in form and arrangement of the various parts of the device, such as will be apparent to those skilled in the art, without departing from the spirit of the invention.

What I claim, and desire to secure by Letters Patent, is:—

1. A device of the class described, comprising a bolt having a threaded portion near one of its ends, and a squared extension beyond the same, provided with notches in its corners; a nut operable on said thread; a collar capable of being positioned on the squared end of said bolt, in engagement with the notches therein; and a coiled spring uniting said nut and collar.

2. A device of the class described, comprising a bolt having a threaded portion near one of its ends; a nut operable thereon; a collar adapted to be received on the end of said bolt so as to be held from rotation thereon; a coiled spring connecting said nut and collar; means for locking said collar from movement longitudinally of the bolt, in connection with the torsion tension of said spring; and additional locking means on the end of said bolt.

3. A self-tightening bolt comprising a shank having a head at one end thereof and having a threaded portion and a tip of non-circular section beyond the threaded portion, a nut threaded upon the shank, a thrust member sleeved upon the said tip and having a bore corresponding to the cross-section of the latter to prevent rotation of the thrust-member on the shank, and a spiral spring interposed between the nut and the thrust member and having its ends respectively interlocked with the nut and the thrust member.

In testimony whereof I affix my signature.

GUSTAVE L. MILLER.